United States Patent [19]

Hanulik

[11] Patent Number: 5,128,266

[45] Date of Patent: Jul. 7, 1992

[54] METHOD FOR TESTING THE RADIOACTIVITY OF OBJECTS CONTAINING METAL OR CONCRETE

[75] Inventor: Jozef Hanulik, Zurich, Switzerland

[73] Assignee: Firma Recytec SA, Switzerland

[21] Appl. No.: 543,484

[22] Filed: Jun. 26, 1990

[30] Foreign Application Priority Data

Jun. 30, 1989 [CH] Switzerland ............... 2445/89

[51] Int. Cl.⁵ .................................... G01N 23/00
[52] U.S. Cl. ................... 436/57; 204/153.1; 250/303; 252/626; 436/73; 436/174; 436/182; 436/183
[58] Field of Search .............. 204/39, 153.1; 252/626, 252/628, 633; 250/303, 304; 436/57, 73, 174, 182, 183

[56] References Cited

U.S. PATENT DOCUMENTS

| | | |
|---|---|---|
| 3,341,304 | 9/1967 | Newby . |
| 3,383,183 | 5/1968 | Grant . |
| 3,409,413 | 11/1968 | Burns et al. . |
| 3,565,707 | 2/1971 | Radimer et al. . |
| 3,873,362 | 3/1975 | Mihram et al. . |
| 3,891,741 | 6/1975 | Carlin et al. . |
| 3,965,237 | 6/1976 | Paige . |
| 4,086,325 | 4/1978 | Cordier et al. . |
| 4,217,192 | 8/1980 | Lerch et al. . |
| 4,443,269 | 4/1984 | Capella . |
| 4,500,449 | 2/1985 | Kuhnke et al. . |
| 4,530,723 | 7/1985 | Smeltzer et al. . |
| 4,537,666 | 8/1985 | Murray et al. . |
| 4,620,947 | 11/1986 | Carlson . |
| 4,686,019 | 8/1987 | Ryan et al. . |
| 4,701,246 | 10/1987 | Fujita et al. . |
| 4,828,759 | 5/1989 | Hanulik .............. 252/628 |
| 4,933,113 | 6/1990 | Hanulik .............. 252/628 |

FOREIGN PATENT DOCUMENTS

| | | |
|---|---|---|
| 0073366 | 3/1983 | European Pat. Off. . |
| 0350401 | 1/1990 | European Pat. Off. ........... 436/57 |
| 2058766 | 5/1972 | Fed. Rep. of Germany . |
| 2421313 | 11/1974 | Fed. Rep. of Germany . |
| 2714245 | 4/1980 | Fed. Rep. of Germany . |
| 2333331 | 6/1977 | France . |
| 0123087 | 9/1979 | Japan .................. 436/57 |
| 891670 | 3/1962 | United Kingdom . |

OTHER PUBLICATIONS

"Dekontamination eines Reaktor-Kuhlwasserkreislaufs am Beispiel des Forschungsreaktors WWR-S in Rossendorf:", II. Unger and D. Westphal, Kernenergie, pp. 285-290, Dec. 11, 1968.
Hall, Nathaniel et al. "Stripping Metallic Coatings." Metal Finishing Guidebook and Directory. vol. 78: No. 1a Mid-Jan., 1980: 505.

Primary Examiner—Robert J. Hill, Jr.
Attorney, Agent, or Firm—Speckman & Pauley

[57] ABSTRACT

Radioactively contaminated objects are placed into a borofluoric acid bath following a rough spot test and are precipitated in a measurable geometry on the cathode plates in the course of an electrolytic process, for example. In the course of the subsequent testing, the metals lying below a pre-determined maximum value of radioactive emissions are separated and supplied to the waste reclamation. The materials lying above this threshold value during the spot testing are first decontaminated and then placed in the acid bath. The borofluoric acid is not used up in this process and remains in the system. It is possible to use already radioactively contaminated boric acid from pressurized water reactors, to which it is merely required to add fluoric acid and to distill, for generating borofluoric acid. The method in accordance with the invention reduces the radioactive waste and reduces the testing and administrative effort required for the release of the non-radioactive materials.

12 Claims, 3 Drawing Sheets ured Republic of Germany:
METHOD FOR TESTING THE RADIOACTIVITY OF OBJECTS CONTAINING METAL OR CONCRETE

BACKGROUND OF THE INVENTION

Before objects containing metal or concrete which had been located in radioactively controlled areas, for example nuclear power plants, hospitals, nuclear research laboratories, or in areas contaminated as a result of accidents or disasters, can be removed from these areas, they must be tested to determine the degree of their radioactive emissions. The appropriate testing regulations prescribed by the Government require for example, among other criteria, a level test area, which should be no smaller than 100 cm². It is furthermore not sufficient to make this test only in one spot of the object, it must be performed over its entire area. The test probes normally used herein have a size of 10×10 cm or 10×20 cm. As a rule, the test time per side of the probe is between 5 and 15 seconds. Each sector tested is marked on the object and is numbered and the test results are set down in a protocol. It can easily be imagined that with such a method two people will take approximately 15 to 20 minutes to test 1 m².

Added to this is the fact that many objects, such as furniture, pipes of various diameters, devices and control boxes, have such a complex shape that they cannot be tested at all under the current testing regulations. As a rule, such objects were considered to be radioactively contaminated, regardless of the intensity of their radiation, and disposed of accordingly. In the course of decontamination, regardless of the degree of contamination, the objects had to be disposed of, since they could not be tested because of their shape, even after contamination was removed, and thus decontamination would have been useless. Those objects which could be tested by the method according to the state of the art and which showed contamination of a specific area above the permissible level were decontaminated. Decontamination was performed by, for example, a so-called electro-chemical method, where the objects were placed in a phosphoric acid bath and approximately 10 to some 100 micrometers were removed by electrolysis. The test was subsequently repeated and, if the objects showed radioactivity below the permissible level, they were returned to future use in the form of scrap. The remaining electrolyte was contaminated and had to be disposed of or regenerated at great expense.

The prerequisites for tests to determine freedom from contamination are set very differently in the various countries. In Switzerland, the Hauptabteilung for Sicherheit der Kernanlagen (HSK) [Department for Safety of Nuclear Installations] is responsible for the nuclear power plants, in the field of medicine it is the Bundesamt für Gesundheit [Federal Health Bureau]. Three different types of tests are performed for releasing radioactive materials. The following threshold values are applicable in Switzerland:

| a. | Surface contamination | α emitters < 1 × 10⁻⁵Ci/cm² |
| | | other nuclides < 1 × 10⁻⁴Ci/cm² |
| b. | Specific activity of | β, γ emitters < 20 nCi/g |
| | | α emitters < 20 pCi/g |
| c. | Dose rate (net) | in the HSK field < 10 μR/h |
| | | in the SUVA field < 50 μR/h |

There is the further prerequisite of proving that even under the most unfavorable conditions no impermissible exposure to radiation of persons not professionally exposed to radiation would occur in the course of the planned method of disposal or use. The following release criteria, listed in extract form, apply for the Federal Republic of Germany:

a. For waste:

< $10^{-4}$-times the limit per gram (for example, for Co-60: 3.7 Bq/g)

acc. to Appendix IV, Table IV, col. 4 in connection with Sect. 4, para. 4, No. 2e, StrlSch V [Order regarding Radiation Protection]

b. For waste and other re-usable residuals:

<0.37 Bq/cm² for other radioactive materials (β,γ emitters)

0.037 Bq/cm² for α emitters acc. to Appendix IX StrlSch V c. For waste and other re-usable residuals: based on the Strahlenminimierungsgebot [Law for Reducing Radiation] Sect. 28 StrlSch V < $10^{-5}$-times of the limit per gram

SUMMARY OF THE INVENTION

It is the object of the present invention to provide a method of testing objects containing metal or concrete which is less time-consuming, allows testing of objects of any shape, reduces the amounts of materials to be radioactively neutralized and eases recycling.

This object is achieved by a method for determining the level of radioactive contamination of objects containing metal or concrete wherein the first step includes rough spot testing the object for contamination. Then the objects which are in the range of or lie below the threshold values of contamination are placed in a second step into a borofluoric acid bath in which they are dissolved and changed into a measurable form. After transformation, the testing to determine the freedom from contamination in accordance with the prescribed methods is performed. The materials lying below a predetermined threshold value of contamination are passed on to unrestricted reuse. A further advantage of this method is that it is possible to use contaminated boric acid from pressurized water reactors for obtaining the required electrolyte.

Two diagrams are shown in the attached drawings.

DESCRIPTION OF PREFERRED EMBODIMENTS

Figure 1:
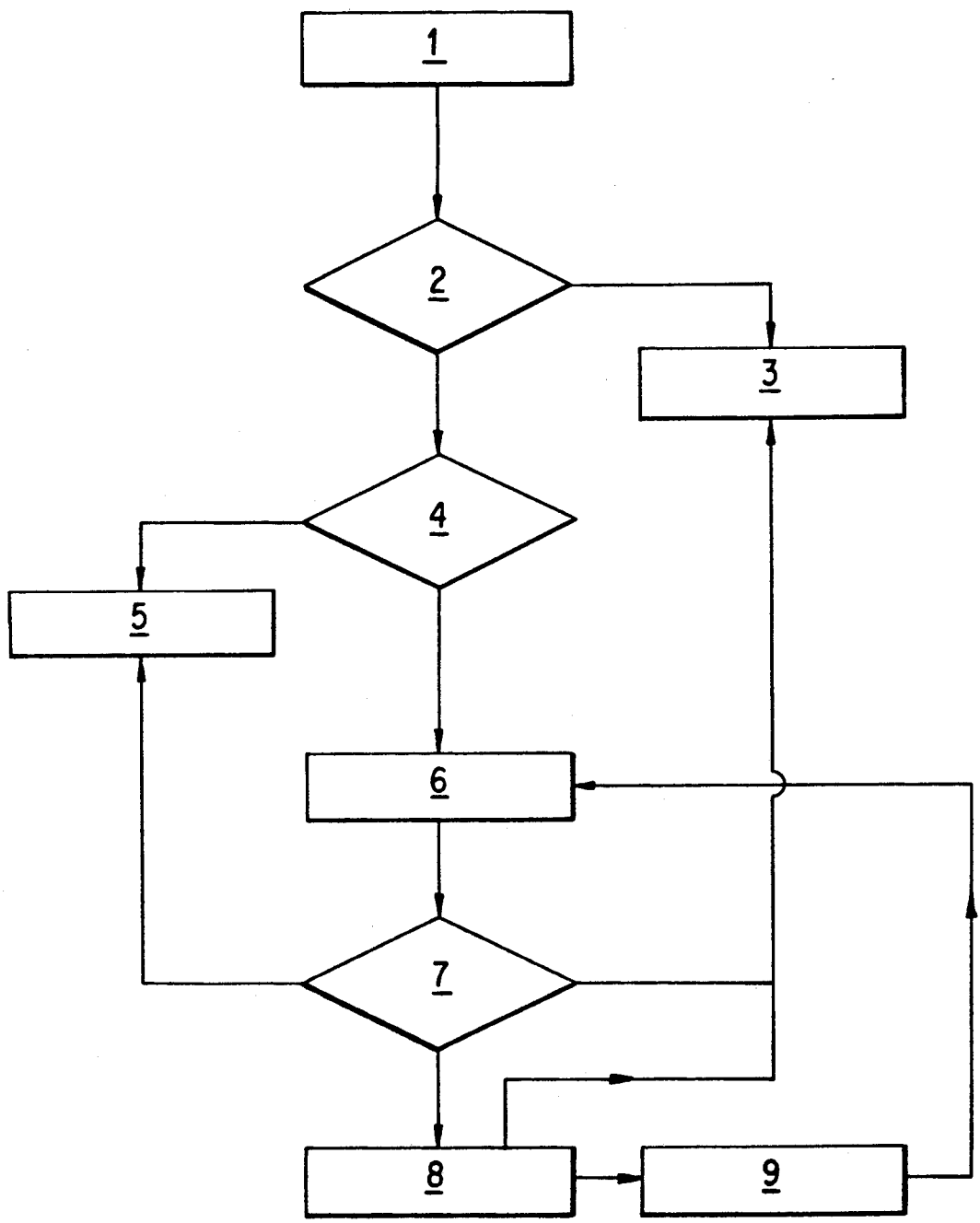
FIG. 1 is a schematic view of a testing method in accordance with the state of the art.

The method already described above is illustrated in FIG. 1 and will here again be described briefly. The contaminated objects 1 are brought in for processing in accordance with the method. A decision is made in the next step 2 whether or not the objects have a geometry suitable for testing for freedom from contamination. Those objects not suitable for such testing are taken to the disposal 3 for radioactive materials. The remaining objects are tested by means of probes at 4 in accordance with the known regulations. Those objects which test below a threshold, i.e. have radioactivity which lies below a maximum permissible threshold value, are considered to be scrap 5 and can be re-used without restrictions. The objects which test above the threshold are placed for decontamination into, for example, an electrolytic bath 6 containing phosphoric acid and are electrolytically decontaminated. After decontamination, the objects are again tested at 7. The objects now lying below the threshold value are further re-used as scrap 5 and those above the threshold value are taken to the disposal 3 for radioactive materials. The electrolyte 8 now is also radioactively contaminated and it is necessary to dispose of it at 3, in most cases by means of an expensive process. However, by means of an extraordinarily expensive method it is possible to perform regeneration 9 of the phosphoric acid and to return it to the electrolytic bath 6.

In this standard test method for freedom from contamination, the surfaces to be tested per ton of metal are approximately 10 to 100 m². Corresponding to the size of the surfaces to be measured, a relatively large number of testing devices are required, the testing time is of considerable length and a plurality of test probes of different shapes must be employed.

Taking into account the expenses occurring in connection with decontamination until the objects are acceptable, the proportional percentages for the procedures required for this are as follows:

a. Costs of classifying the materials, 5 to 15%;

this includes the preparation of appropriate documentation, determination of the quality of the materials present and the degree of their contamination.

b. Costs of disassembly and cutting up, 10 to 20%;

however, in certain cases this may be considerably higher.

c. Costs of decontamination, 10 to 40%; this includes the costs of the required chemicals, the decontamination installation, the energy required and the corresponding expenditures for personnel.

d. Costs of the tests for determining freedom from contamination, 10 to 50%;

this item is mainly comprised of personnel expenditures and costs of test instruments and test probes.

e. Costs of issuing clearances, 5 to 15%;

this primarily includes the administrative expenditures for the preparation of reports and completing forms.

f. Costs of disposal, including intermediate and final storage of secondary waste, 5 to 500%;

depending on the activity of the material to be disposed of, these costs vary considerably and are almost impossible to determine today.

By means of the method according to this invention as described below, the costs for items c to f in particular are considerably reduced.

Figure 2:
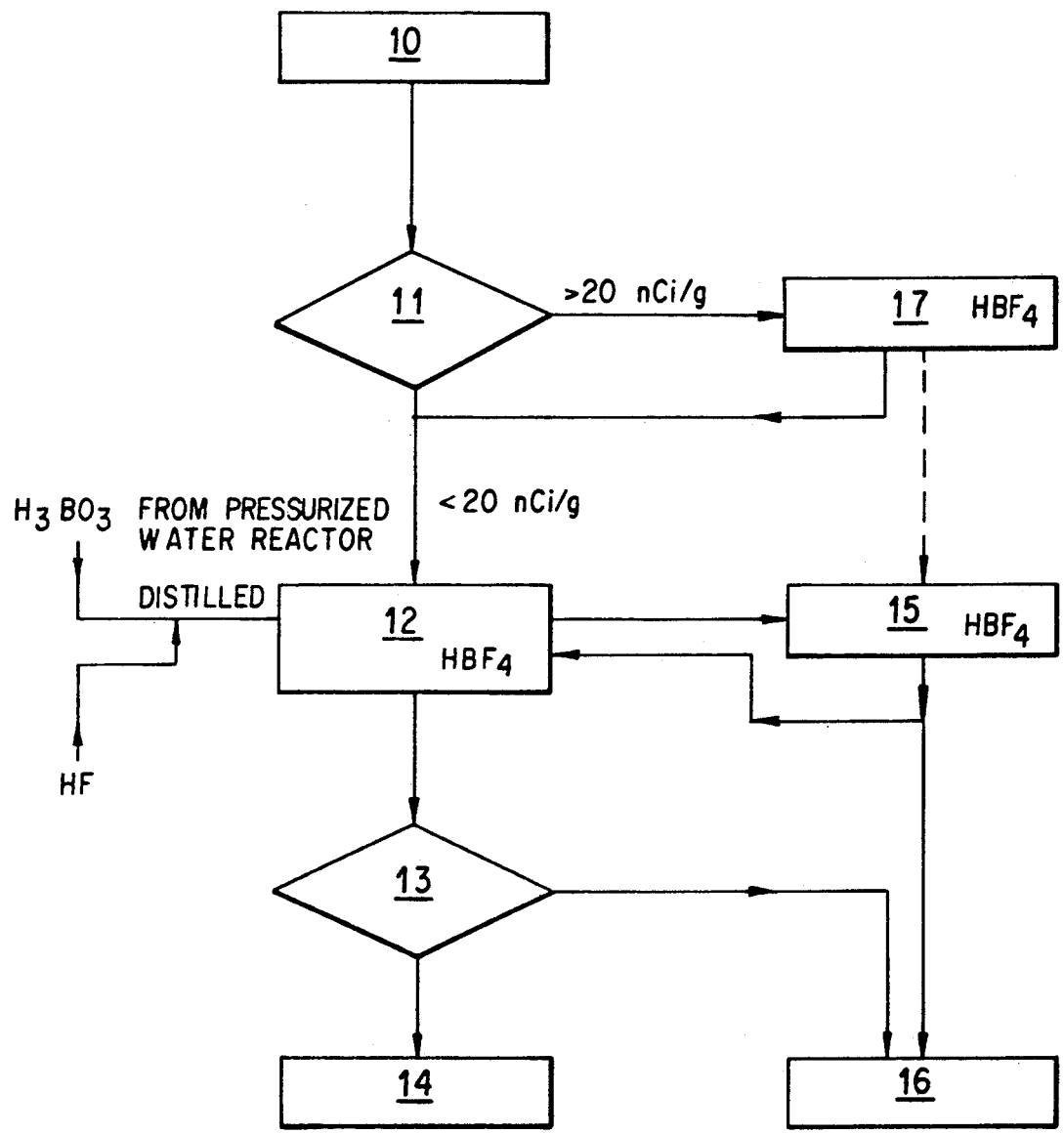
FIG. 2 is a flow chart of a testing method in accordance with the invention.

In the method in accordance with the invention and as illustrated in FIG. 2, all contaminated objects 10 are subjected in a first step to rough spot testing 11 of the intensity of the radiation with respect to surface contamination and the specific activity. The surface contamination is tested by means of flat contact test probes (Kontamat ™). To determine the specific activity, samples are taken by drilling, for example, which result in information regarding the radioactivity inside the material. The specific activity is particularly rich in information and permits an estimate of the possibility of successful decontamination to a value below the threshold value of contamination. In Switzerland the threshold value is 20 nCi/g.

In the method in accordance with this invention and as illustrated in FIG. 2, all contaminated objects 10 are subjected in a first step to rough spot testing 11 of the intensity of the radiation. All those objects which fall below the above identified threshold of 20 nCi/g for example, are immersed in a borofluoric acid bath 12 in a second step and completely dissolved in it. The objects are now available in a first measurable geometry. The entire solution now can be stirred and thus homogenized, so that a sample of it gives a representative test value which allows conclusions as to the activity of the materials obtained from the solution. Removal of the materials from the solution is performed by known methods. These known methods include either a chemical method, for example by precipitation, or an electrochemical method of electrolytic removal of the metals. While the first method can be used for all materials, i.e. also for cement-containing materials, the second method is only applicable to metallic materials, such as Fe, Cr, Ni, Cu, Pb, etc.

Figure 3:
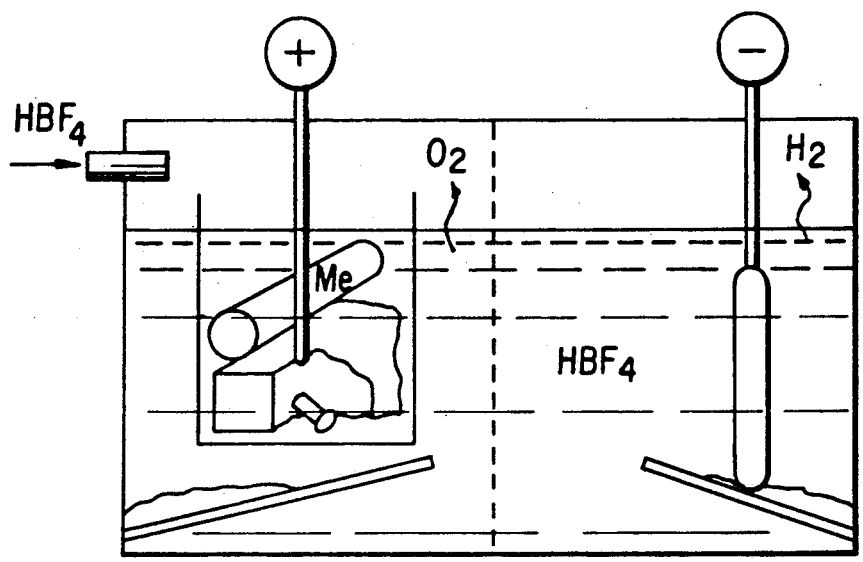
FIG. 3 is a schematic view of a chemical transformation of the geometry.

If there are only metal objects, the borofluoric acid bath can be used at the same time as an electrolytic bath. All contaminated metal objects are placed directly or indirectly against the anode (FIG. 3). This can be done indirectly by placing the metal objects into a basket with a graphite bottom and placing the basket itself against the anode. The electrolyte is ten to twenty percent borofluoric acid ($HBF_4$). Metal plates are hung in the electrolyte on the other side of the bath and are used as cathodes. The voltage between the anode and the cathode is 2 to 4 Volts. The current density is 10 to 50 mA/cm². The extremely high solubility of the metals in borofluoric acid makes it possible to dissolve the objects completely. The radioactive materials, such as Cs, Pu, isotopes of Sr, practically remain in the solution in the form of ions. Only the Co-60 isotope is deposited on the cathode together with the other materials. This constitutes an additional decontamination effect. The plates with the deposited metal are removed from the cathode and can now be simply tested in accordance with the customary, approved test methods. The present geometry of the metal does not require any particularly shaped test probes. By means of the test 13 it is now determined whether the metal deposited on the plates is below the threshold as predicted. If this is true, then it is considered to be scrap 14 which can be used without restriction in industry and can be made available for normal re-use. The borofluoric acid itself used as electrolyte can be recycled and used again. The acid itself is not used up in this method. If the radioactive charge of the electrolyte is too high, it can be regenerated at 15 by precipitation with $Ca^{2+}$ ions, silicate solutions or oxalic acid. The precipitate settles on the floor of the bath and can be removed therefrom. The sediments containing radioactivity are subsequently disposed of at 16 by solidification in concrete or bitumen.

Materials which, against all expectations, were not below the threshold for contamination after the execution of the method will be disposed of as radioactive waste.

Those objects which are contaminated on the surface and are above a value of 20nCi/g of activity, are first subjected to a surface decontamination at 17. This is also done by using the borofluoric acid already mentioned.

Figure 4:
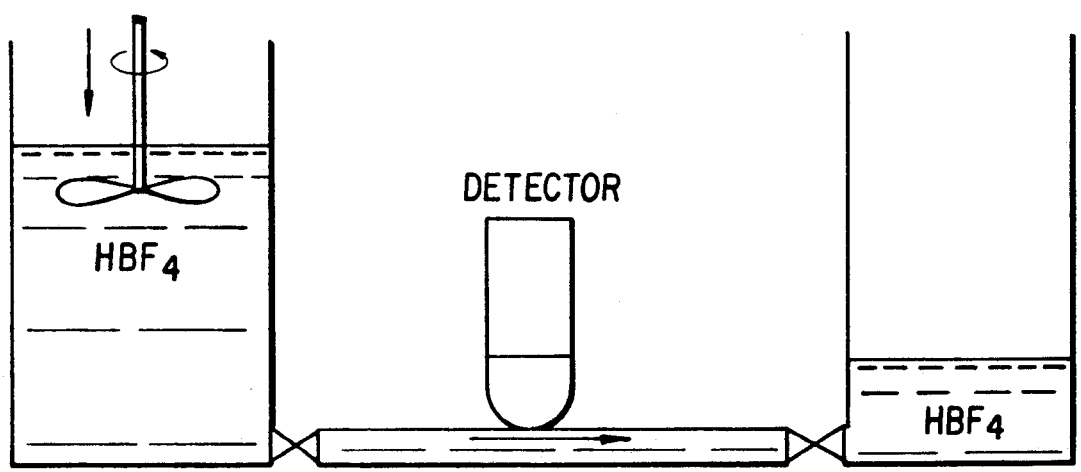
FIG. 4 is a schematic view of an electro-chemical transformation of the geometry.

Instead of only taking a sample from the solution to test it, it is also possible to pump the entire stirred solution via a pipe from the acid bath into a reservoir and to move it past a detector, where the dose rate is measured (FIG. 4). The materials present in the ten to twenty percent borofluoric acid solution can again be removed in the reservoir by electro-chemical or chemical means, as described above.

It is possible to use the radioactively contaminated boric acid from pressurized water reactors as electrolyte. It is only necessary to add fluoric acid to the boric acid for generating the desired borofluoric acid. For decontamination it is relatively simple to distill it. This is advantageously performed with underpressure. When the two test methods are quantitatively compared, it will be noted that with the test method in accordance with the state of the art it is necessary to test approximately 10 to 100 mz of partially hard-to-measure surfaces per ton of material, while with the novel method and with the same amount it is only necessary to test approximately 2 to 5 mz of an easily measured surface, if the metals are precipitated from the solution electrolytically and are present at the cathode plates. If the chemical method is used, the test effort is even less, because only the samples of the solution must be tested.

In this way the method in accordance with the invention reduces the amounts of the materials to be disposed of, which primarily results in a reduction of the secondary waste. But the disassembly and cutting up costs become less because it is no longer required to cut up the contaminated objects into measurable geometries. In particular, however, the costs of the tests for determining freedom from contamination are reduced many times over.

Reference is made to the attached table for an explanation of the background in regard to the activities in solids as well as their activities in solution and their dose rate. The values cited there are in respect to the Co-60 isotope. This table is intended to make it easier to understand the technology regarding testing to determine freedom from contamination. The placement of the line which represents the still possible testing should be adapted to the specific national laws of the respective country.

What is claimed is:

1. A method for determining the level of radioactive contamination of objects containing at least one of metal and concrete, the method comprising the steps of: rough spot testing objects for radioactive contamination; placing objects having a level of radioactive contamination one of in a range of and below at least one threshold value as determined by said rough spot testing into a borofluoric acid bath in which the objects are dissolved and transformed into materials having a measurable form; after transformation, testing said materials to determine radioactive contamination; and passing on to unrestricted reuse materials having a level of radioactive contamination below a predetermined threshold value.

2. A method according to claim 1, wherein objects having a level of radioactive contamination above said at least one threshold value as determined by the rough spot testing are decontaminated before passing the objects on to the borofluoric acid bath.

3. A method according to claim 2, wherein borofluoric acid present in the borofluoric acid bath is also used as a decontamination means.

4. A method according to claim 3, further comprising regenerating contaminated borofluoric acid by addition of a precipitation medium and solidifying a sludge of adsorbing radioactive materials, which is generated thereby and settles, with at least one of concrete and bitumen for radioactive disposal.

5. A method according to claim 4, wherein the precipitation medium is selected from the group consisting of $Ca^{2+}$ ions, silicate solutions, oxalic acid and sulfides.

6. A method according to claim 1, further comprising stirring objects dissolved in the borofluoric acid bath forming a homogeneously distributed solution, and determining radiation activity of the solution.

7. A method according to claim 1, further comprising pumping the solution formed by objects dissolved in the borofluoric acid bath into a second container, passing the solution over a detector which determines radiation intensity, and determining radiation activity of the solution.

8. A method according to claim 1, further comprising chemically transforming objects dissolved in the boro-

| | Threshold of Application of the Method for Testing the Freedom from Contamination (shown for Co-60) | | |
|---|---|---|---|
| Solid Metal e.g. Fe, Ni, Activity/g | Amount of Active Solids in Solution 20-200 g/l Activity/Liter | Concentration of Salts in 1 liter Solution (g) | Dose Radiation for Salt-Metal from 1 liter solution R/h |
| 1 pCi/g | 20-200 pCi/l | 60-600 | apprx. 1 μR/h |
| 10 pCi/g | 200-2000 pCi/l | 60-600 | apprx. 10 μR/h |
| 100 pCi/g | 2-20 nCi/l | 60-600 | apprx. 100 μR/h |
| 1 nCi/g | 20-200 nCi/l | 60-600 | |
| 10 nCi/g | 200-2000 nCi/l | 60-600 | |
| 20 nCi/g | 2-20 μCi/l | 60-600 | |
| 100 nCi/g | 0.2-2 mCi/l | 60-600 | apprx. 2 mR/h at 1 m distance |

Spec. Activity for Threshold limit (CH) = 20 nCi/g ($\beta/\gamma$)
= 20 pCi/g ($\alpha$)
Threshold Limit (FRG) = 0.37 Bq/g for ($\beta/\gamma$)
= 0.037 for $\alpha$
Dose Measurement Threshold limit HSK = 10 μR/h
===== = Limit of Application of Measurement fluoric acid bath into materials having a measurable form.

9. A method according to claim , further comprising chemically precipitating objects dissolved in said borofluoric acid bath to transform the into material, having a measurable form.

10. A method according to claim 1, further comprising electrochamically precipitating objects dissolved in the borofluoric acid bath to transform them into materials having a measurable form.

11. A method according to claim 10, wherein objects are connected to an anode in the borofluoric acid bath and deposited on a cathode palate having a measurable geometry.

12. A method according to claim 1, wherein borofluoric acid present in the borofluoric acid bath is obtained by separation of contaminated boric acid from pressurized reactor water the addition of fluoric acid.

* * * * *